(12) United States Patent
Troll et al.

(10) Patent No.: US 6,316,050 B1
(45) Date of Patent: Nov. 13, 2001

(54) METHOD OF PRODUCING HYDROPHOBIC PYROGENICALLY PRODUCED OXIDES

(76) Inventors: Harald Troll, Schanzenkopfstrasse 15, Alzenau (DE), DE-63755; Thomas Hennig, Spessartstrasse 5, Gelnhausen (DE), DE-63571; Jurgen Meyer, Hans-Bockler-Strasse 4, Stockstadt (DE), DE-63811; Uwe Schachtely, Bergstrasse 10, Rodenbach (DE), DE-63517; Henning Karbe, Emil-von-Behring-Strasse 16, Gelnhausen (DE), DE-65462

( * ) Notice: Subject to any disclaimer, the term of this patent is extended or adjusted under 35 U.S.C. 154(b) by 0 days.

(21) Appl. No.: 09/217,886

(22) Filed: Dec. 22, 1998

Related U.S. Application Data

(60) Provisional application No. 60/070,105, filed on Dec. 31, 1997.

(30) Foreign Application Priority Data

Dec. 22, 1997 (DE) ............................................. 197 57 210

(51) Int. Cl.[7] ......................................................... B05D 7/00
(52) U.S. Cl. ........................ 427/213; 427/220; 427/255.3; 427/255.6
(58) Field of Search ...................... 428/403, 404, 428/405, 407; 427/212, 213, 220, 255.3, 255.6

(56) References Cited

U.S. PATENT DOCUMENTS

| | | |
|---|---|---|
| 2,803,617 | 8/1957 | Corrin . |
| 3,920,865 | * 11/1975 | Laufer et al. ......................... 427/220 |
| 4,007,050 | * 2/1977 | Laufer et al. ......................... 106/483 |
| 4,022,152 | * 5/1977 | Laufer et al. ......................... 118/716 |
| 4,102,703 | * 7/1978 | Tully ............................... 106/287.14 |
| 4,191,587 | 3/1980 | Kratel et al. . |
| 5,183,710 | * 2/1993 | Gerbino ............................... 428/405 |

FOREIGN PATENT DOCUMENTS

| | | |
|---|---|---|
| 1 163 784 | 2/1964 | (DE) . |
| 0 340 129 | 11/1989 | (EP) . |
| 1 234 245 | 10/1960 | (FR) . |
| 1 520 663 | 8/1968 | (FR) . |
| 2 411 157 | 7/1979 | (FR) . |
| 887257 | 1/1962 | (GB) . |
| 932753 | 7/1963 | (GB) . |
| 1031764 | 6/1966 | (GB) . |

* cited by examiner

Primary Examiner—Hoa T. Le
(74) Attorney, Agent, or Firm—Pillsbury Winthrop LLP

(57) ABSTRACT

Hydrophobic, pyrogenically produced oxides having a ratio of dimethylsilyl groups to monomethylsilyl groups of 100:0 to 50:50 are prepared by using siloxanes or methylsiloxane mixtures D3 to D9 as hydrophobing agent.

10 Claims, 1 Drawing Sheet

METHOD OF PRODUCING HYDROPHOBIC PYROGENICALLY PRODUCED OXIDES

CROSS-REFERENCE TO RELATED APPLICATIONS

This application is a continuation of U.S. provisional application No. 60/070,105, filed Dec. 31, 1997, and German application, DE 19757210.3, filed Dec. 22, 1997, the entire disclosures of which are incorporated herein by reference.

FIELD OF THE INVENTION

The present invention relates to hydrophobic, pyrogenically produced oxides, a process for their production, as well as their use.

BACKGROUND OF THE INVENTION

It is known to treat pyrogenically produced oxides, oxide mixtures or mixed oxides of metals and/or metalloids with hydrophobing agents, for example dimethyldichlorosilane (DE AS 11 63 784).

It is also known to treat finely particulate oxides in a bed with octamethylcyclotetrasiloxane (GB-A 887 257).

It is furthermore known to render finely particulate oxides hydrophobic with octamethylcyclotetrasiloxane in a one-pot process (GB-A 932 753, U.S. Pat. No. 2 803 617).

The known processes have the disadvantage that the octamethylcyclotetrasiloxane is not completely bonded to the surface of the oxides.

SUMMARY OF THE INVENTION

The object of the invention is accordingly to develop a process for the surface treatment (hydrophobing) of highly dispersed oxides, oxide mixtures or mixed oxides of metals and/or metalloids that does not have these disadvantages.

The invention relates to hydrophobic, pyrogenically produced oxides, oxide mixtures or mixed oxides of metals and/or metalloids, which is characterised in that the above compounds have a ratio of dimethylsilyl groups to monomethylsilyl groups of 100:0 to 50:0, preferably 100:0 to 70:30.

The ratio of dimethylsilyl groups to monomethylsilyl groups is determined by means of Si-29-solid body NMR spectroscopy.

The temperature control during the hydrophobing steps is important as regards the adjustment of the ratio of dimethylsilyl groups to monomethylsilyl groups.

In the treatment of pyrogenic silicic acid having a hydrophilic surface of 200 $m^2/g$ at temperatures of 350° C. to 450° C., products containing 100% dimethylsilyl groups are obtained on the silicic acid surface. The thickening action of the hydrophobic silicic acids obtained is 2500 to 3000 mpas as measured in Araldite. If the temperature is raised to 550° C. to 600° C., the monomethylsilyl fraction rises to about 30%. The ratio of dimethylsilyl groups to monomethylsilyl groups is thus 70:30. The thickening of the resultant hydrophobic silicic acids is between 400 to 1000 mpas. The amount of chemically bound carbon increases from on average 1.2% to 1.6–1.9%. The methanol wettability rises by 5 to 8% and reaches values of on average 45% (maximum 51%).

The possibility of being able to produce hydrophobic silicic acids having a specific dimethylsilyl to monomethylsilyl ratio and consequently having a defined rheology (thickening behaviour) and low chloride content provides advantages for their use in products that should have as small a residual content of corrosive by-products as possible (for example hydrochloric acid or ammonia).

Examples of possible applications of a hydrophobic silicic acid according to the invention having a dimethylsilyl to monomethylsilyl group ratio of 100:0, i.e. a 100% dimethylsilyl fraction with a relatively low methanol wettability as well as a low chloride content, are particularly stable sealants for the building and construction industry, especially if a high transparency is necessary, for example when jointing glass facades or in the sanitary sector.

For a hydrophobic silicic acid according to the invention having a dimethylsilyl to monomethylsilyl group ratio of 70:30, i.e. with a 70% dimethylsilyl fraction and low thickening, high methanol wettability as well as low chloride content, possible applications include self-levelling sealants for optimum joining/bridging of structural parts and joints, silicone compositions having a low viscosity and thixotropy that ensure an optimum casting and shaping accuracy and reproduction of details (for example casting compositions, dental casting materials), highly transparent polymethacrylate compositions, which previously were normally produced by a compression moulding process but which now have a lower viscosity on account of the use of the silicic acid according to the invention and can therefore be produced by a substantially quicker injection moulding process, for example highly transparent shoe soles based on EPDM, and in sealing electronic circuits based on silicone rubber, where a very low chloride content is important for the longevity of the electronic components (corrosion protection).

The invention also provides a process for the surface treatment of highly dispersed oxides, oxide mixtures or mixed oxides of metals and/or metalloids that have been obtained by thermal decomposition of volatile compounds of these metals or metalloids in the vapor state in the presence of gases or vapors having a hydrolyzing and/or oxidizing action, by reacting their free OH groups or released OH groups located on the surface with hydrophobing agents that are capable of reacting with hydroxyl groups, in a fluidized bed, until they have a ratio of dimethylsilyl groups to monomethylsilyl groups of 100:0 to 50:50, preferably 100:0 to 70:30 in which connection the still acidic oxides, oxide mixtures or mixed oxides are mixed as homogeneously as possible directly following their preparation, with a previously evaporated hydrophobing agent and are treated, under the exclusion of oxygen, together with small amounts of steam and optionally with an inert gas in continuous operation at temperatures of about 200° to about 800° C., preferably about 400° to about 600° C., in a fluidized bed, and the solid reaction products are if necessary post-deacidified and dried, contact with oxygen before cooling to below about 200° C. preferably being avoided, which process is characterized in that unhalogenated, chain-type siloxanes, monocyclic methyl-dimethylcyclosiloxane mixtures (D3 to D9), preferably octamethylcyclotetrasiloxane (D4) are used as hydrophobing agent.

The polydimethylcyclosiloxanes (D3 to D9) are known compounds of the general empirical formula $[(CH_3)_2 SiO]_n$, where n may be 3 to 9. This nomenclature is given in Ullmanns Encyklopädie der technischen Chemie (1982), vol. 21, p. 515, as well as in W. Noll, Chemie und Technologie der Silicone (Chemistry and Technology of Silicones) (1968), Verlag Chemie, p. 237, the disclosures of which are incorporated herein by reference.

Pyrogenically produced, in particular by flame hydrolysis or high temperature hydrolysis, oxides, oxide mixtures or mixed oxides of metals and/or metalloids and their preparation are known (Ullmanns Encyklopadie der technischen Chemie, 4th Edition, vol. 21, p. 464 ff., which disclosure is incorporated herein by reference).

The Aerosil types Aerosil 200 and Aerosil 300, which have long been commercially available, are likewise disclosed in the same source. Aerosil 200 and Aerosil 300 are furthermore known from "Aerosil-Herstellung, Eigenschaften und Anwendung", (Aerosil production, properties and uses) Degussa company publication, June 1978 edition, the disclosure of which is incorporated herein by reference.

Pyrogenically produced oxides with a BET surface of 20 to 400 $m^2/g$, preferably 50 to 380 $m^2/g$, may preferably be used as hydrophilic starting materials.

In an embodiment of the invention, the oxides mixed with the octamethylcyclotetrasiloxane (D4) may be added together with the carrier medium to the fluidized bed and continuously removed from the upper part, preferably after passing through a settling zone known per se.

The treatment may furthermore be carried out in an internally heated fluidized bed known per se.

The required heat may be added in a manner known per se, partly in the form of steam and/or a hot inert gas.

The steam and/or the inert gas may be used in a manner known per se at the same time for the pneumatic conveyance of the reactants.

In the process according to the invention, the ratio of dimethylsilyl groups to monomethylsilyl groups on the hydrophobic, pyrogenically produced oxide may be controlled by the temperature regulation during the hydrophobing.

In a preferred embodiment of the invention, the temperature in one region may be varied from 500° to 600° C., a residence time of 0.5±0.2 hour being maintained.

The addition of the preferably used hydrophobing agent octamethylcyclotetrasiloxane (D4) may take place in the form of vapor.

If necessary still adhering hydrochloric acid as well as excess hydrophobing agent may be removed in a downstream-connected, dammed countercurrent fluidized bed at temperatures of 2500° to 350° C. with a residence time of 0.5±0.2 hour. The damming and thus the degree of filling of the deacidifying fluidized bed is achieved by throttling the product discharge valve. The pressure difference that is established between the top and bottom of the fluidized bed due to the hydrostatic pressure can be maintained at the fluidized bed outlet by post-adjustment of the product discharge valve to 20 to 40 mm water column.

The process according to the invention may be carried out in a countercurrent or, more conveniently, in a co-current process. In this connection, the fluidized bed may be dimensioned so that the eddying suspension of silicic acid and hydrophobing agent constantly migrates upwards and can be continuously removed from the upper part of the space, preferably after passing through a settling zone.

The dimethylsilyl/monomethylsilyl ratio and thus the thickening behavior of the resultant products may advantageously be specifically adjusted by varying the temperature in the hydrophobing fluidized bed.

Excess hydrophobing agent that has not become chemically bound to the silicic acid surface may be withdrawn from the upper part of the fluidized bed.

In the process according to the invention the hydrophobing and deacidification may also be carried out in a jointly used apparatus. This apparatus may then preferably be designed so that the hydrophobing can be carried out in co-current (inner jacket) and the deacidification in countercurrent (outer jacket).

The process according to the invention may advantageously be carried out directly following the pyrogenic oxide production process. The addition of acids or bases, which are conventionally used as catalyst in the hydrosilylation reaction, may be omitted in the continuous process according to the invention if the hydrophobing is carried out on non-deacidified, pyrogenically produced silicic acids.

This procedure has, compared to the process according to DE-AS 11 63 784, the advantage that the acids (such as HCl) or bases that are catalytically necessary for the hydrosilylation reaction do not produce any acidic by-products, e.g. HCl, at all.

By coupling the process steps of the silicic acid production with the directly following silylation reaction (hydrophobing), products can be obtained having very low proportions of acidic by-products.

Since no acidic by-products, e.g. HCl, are formed, then according to Le Chatelier's Principle the reaction of the free silanol groups with non-halogen-containing siloxanes is also inhibited. The resultant faster, optimized reaction rate also permits the hydrophobing of large-surface, pyrogenically produced silicic acids, in contrast to the known process according to DE-AS 11 63 784.

The hydrophobic oxides according to the invention have the advantage of a very small content of residual chloride, of at most 100 ppm.

DETAILED DESCRIPTION OF THE PREFERRED EMBODIMENTS

EXAMPLE 1

Figure 1:
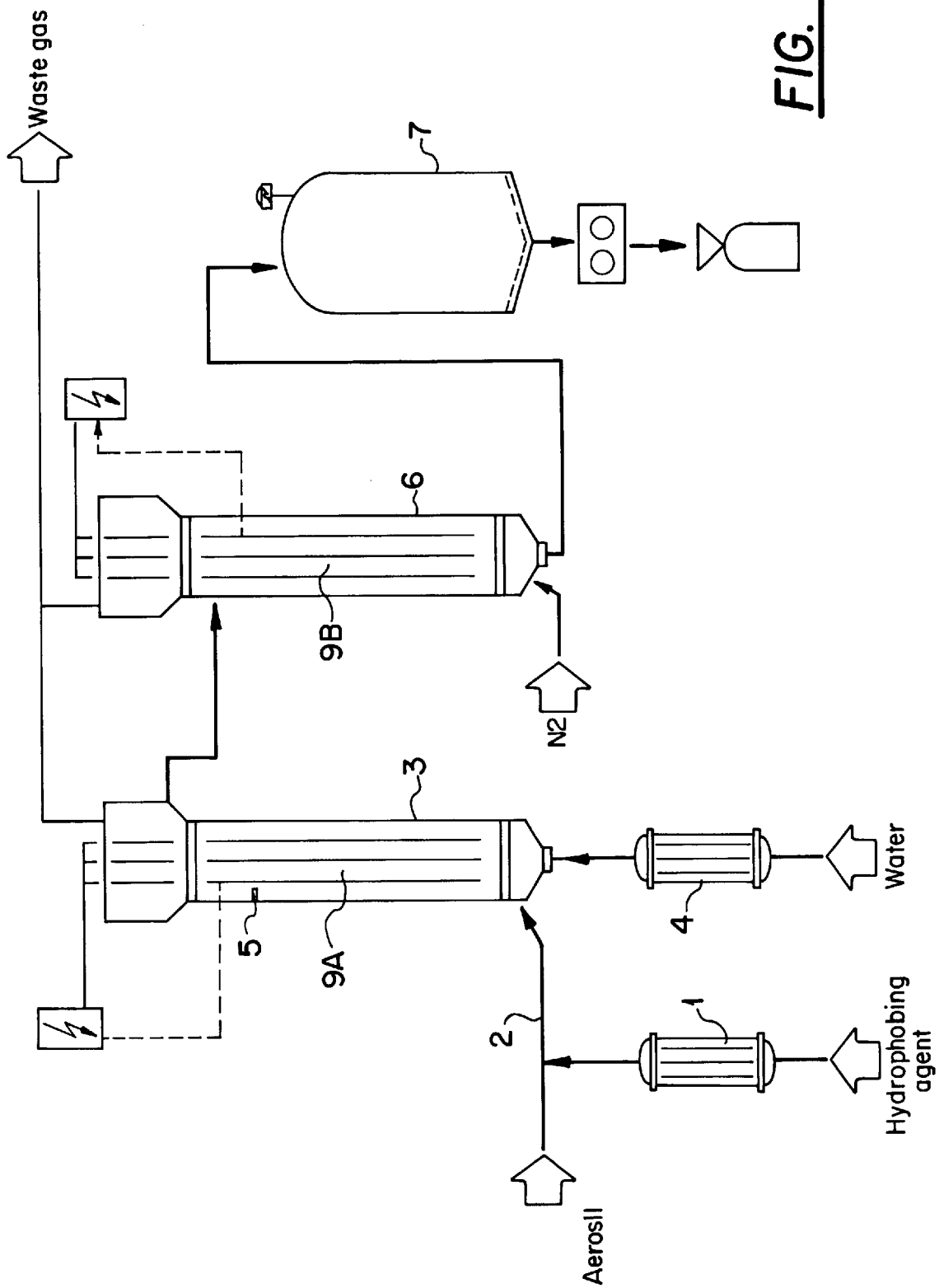
FIG. 1 illustrates, schematically, apparatus for carrying out a process according to the invention.

The production of the hydrophobic silicic acid 1 (based on pyrogenically produced silicic acid Aerosil 200) and the hydrophobic silicic acid 2 (based on pyrogenically produced silicic acid Aerosil 300) takes place fully continuously according to DE-AS 11 63 784.

The pyrogenically produced silicic acid Aerosil 200 or Aerosil 300 is intensively mixed with octamethylcyclotetrasiloxane (D4) vapor in an injector in the same apparatus—without previously being deacidified and subjected to intermediate storage—and is then added to a co-current fluidized bed rendered inert with nitrogen.

The octamethylcyclotetrasiloxane (D4) is chemically bound to the Aerosil surface by treatment with steam at a temperature of 500°–600° C. and a residence time of 0.5 hour in the fluidized bed. The dimethylsilyl/monomethylsilyl ratio of the surface groups can be controlled by varying the temperature in the fluidized bed. Still adhering hydrochloric acid as well as excess octamethylcyclotetrasiloxane are removed in a downstream, dammed countercurrent fluidized bed at temperatures of 2500 to 350° C. (residence time about 0.5 hour). The damming and thus the degree of filling of the deacidification fluidized bed is achieved by throttling the product discharge valve. The pressure difference between the top and bottom of the fluidized bed that is established as a result of the hydrostatic pressure of the pyrogenic silicic acid is maintained at 20 to 40 mm water column at the fluidized bed outlet by automatic post-regulation of the discharge valve. The dimethylsilyl/monomethylsilyl ratio is 70:30 for both hydrophobic silicic acids.

EXAMPLE 2

The process is carried out according to Example 1, except that a surge tank is located between the hydrophobing fluidized bed and the deacidification fluidized bed.

EXAMPLE 3

The process is carried out according to Example 1, the temperature not exceeding 350° C. during the hydrophobing step and hydrochloric acid additionally being fed in through a nozzle. The dimethylsilyl to monomethylsilyl ratio is 100:0.

The process parameters for Examples 1 to 3 are shown in Table 1. The physico-chemical data of the produced silicic acids 1 and 2 are shown in Table 2.

The pyrogenically produced silicic acids used as educts have the following physico-chemical characteristic data:

| Phys.-chem. data | Aerosil 200 | Aerosil 300 |
|---|---|---|
| Spec. surface ($m^2/g$) | 200 ± 25 | 300 ± 30 |
| Drying loss (%) | <1.5 | <1.5 |
| Annealing loss (%) | <1 | <2 |
| $SiO_2$-content (%) | >99.8 | >99.8 |

TABLE 1

| Example 1 (Silicic acid 1) | |
|---|---|
| Aerosil 200 | 106 kg/h |
| D4 | 177° C. |
| D4 | 14.5 kg/h |
| D4 N2 inj. | 10 $m^3$/h |
| N2 · FB 9A | 6 $m^3$/h |
| Water 9A | 5 kg/h |
| FB 9A temp., at top | 540–570° C. |
| FB 9B temp., at top | 300° C. |
| T spent gas | ca. 260° C. |
| Example 2 (silicic acid 2) | |
| Aerosil 300 | 106 kg/h |
| D4 | 170–175° C. |
| D4 | 15.5 kg/h |
| D4 N2 inj. | 10 $m^3$/h |
| N2 FB 9A | 6 $m^3$/h |
| Water 9A | 7 kg/h |
| FB 9A temp., at top | 550–580° C. |
| FB 9B temp., at top | 350° C. |
| T spent gas | ca. 260° C. |
| Example 3 (silicic acid 1) | |
| Aerosil 200 | 1500 g/h |
| D4 | 182 g/h |
| Hydrochloric acid ca. 11 wt. % | 35 g/h–60 g/h |
| FD water | 65 g/h–30 g/h |
| Fluidized bed temp. max. | 350° C. |

Glossary for Table 1:
D4 = octamethylcyclotetrasiloxane
D4 N2 inj. = nitrogen as carrier gas for $D_4$ injection
N2 FB 9A = Nitrogen for first fluidized bed (A)
9A = first fluidized bed (A)
9B = second fluidized bed (B)
T spent gas = spent gas temperature
FD water = feed stream deionized water.

TABLE 2

| Properties | Silicic acid 1 | Silicic acid 2 |
|---|---|---|
| Behavior with respect to water | Hydrophobic | Hydrophobic |
| Surface according to BET $m^2/g$ | 150 ± 25 | 250 ± 30 |
| Mean size of the Primary particles nm | 12 | 7 |
| Drying loss | <0.1 | <0.3 |
| Tamped density | About 50 | About 50 |
| pH-value (4% in water) | >4.0 | >3.7 |
| Carbon % | 1.0–2.0 | 1.5–3.0 |
| Dimethylsilyl/Monomethylsilyl % | 50/50 to 100/0 | 50/50 to 100/0 |
| $SiO_2$ % | <99.8 | <99.8 |
| $Al_2O_3$ % | <0.05 | <0.05 |
| $FeO_3$ % | <0.01 | <0.01 |
| $TiO_2$ % | <0.03 | <0.03 |
| HCl % | <0.02 | <0.025 |

The methanol wettability of silicic acids 1 and 2 is as follows:

| silicic acid 1 | 40% | (high level of thickening) to |
| | >45% | (low level of thickening) |
| silicic acid 2 | 35% | (high level of thickening) to |
| | >40% | (low level of thickening) |

The process according to the invention may be carried out in an apparatus arrangement as illustrated in FIG. 1.

According to FIG. 1 the hydrophobing agent is evaporated in the evaporator 1 and mixed with the pyrogenic oxide in the line 2. This mixture is fed to the fluidized bed reactor 3 (fluidized bed A). Steam that is generated in the evaporator 4 is added from below to the fluidized bed reactor 3. The hydrophobing temperature is controlled by means of the temperature measuring device 5. The treated product is withdrawn from the top of the fluidized bed reactor 3 and fed to the top of the countercurrent reactor 6 (fluidized bed B). Nitrogen is led upwardly through countercurrent reactor 6, from below, in a countercurrent stream. The treated product is withdrawn from the bottom of the countercurrent reactor 6 and passed to the silo 7.

What is claimed is:
1. A process for treatment of a surface of highly dispersed oxides, oxide mixtures or mixed oxides of at least one member selected from the group consisting of metals and metalloids that have been obtained by thermal decomposition of volatile compounds of these metals or metalloids in a vapor state in the presence of gases or vapors having a hydrolyzing and/or oxidizing action, comprising:

reacting free OH groups or released OH groups located on the surface with hydrophobing agent that reacts with hydroxyl groups, in a fluidized bed, until a ratio of dimethylsilyl groups to monomethylsilyl groups of 100:0 to 50:50 is reached, directly following their preparation, mixing still acidic oxides, oxide mixtures or mixed oxides homogeneously, with a previously evaporated hydrophobing agent, followed by treating, with exclusion of oxygen, together with small amounts of steam and optionally with an inert gas in continuous operation at temperatures of about 2000 to about 800° C., in a fluidized bed;

optionally post-deacidifying and drying solid reaction products; and optionally avoiding contact with oxygen before a step of cooling to below about 200° C.;

wherein the hydrophobing agent comprises at least one member selected from the group consisting of unhalogenated chain siloxanes and monocyclic methylcyclosiloxane mixtures.

2. A process according to claim 1, wherein the temperature in the fluidized bed is about 400° C. to about 600° C.

3. A process according to claim 1, wherein the hydrophobing agent comprises octamethylcyclotetrasiloxane.

4. A process according to claim 3, wherein the oxides mixed with the octamethylcyclotetrasiloxane are added jointly together with the carrier medium to the fluidized bed and are withdrawn continuously from the upper part thereof.

5. A process according to claim 3, wherein the oxides mixed with the octamethylcyclotetrasiloxane are added jointly together with the carrier medium to the fluidized bed, and after passing through a settling zone in the fluidized bed are withdrawn continuously from the upper part of the fluidized bed.

6. A process according to claim 1, comprising carrying out the treatment in an internally heated fluidized bed.

7. A process according to claim 1, comprising adding required heat at least partially as steam.

8. A process according to claim 7, further comprising using the steam for pneumatic conveyance of the reactants.

9. A process according to claim 1, comprising adding required heat at least partially as a hot inert gas.

10. A process according to claim 9, further comprising using the inert gas for pneumatic conveyance of the reactants.

* * * * *

UNITED STATES PATENT AND TRADEMARK OFFICE
CERTIFICATE OF CORRECTION

| | | |
|---|---|---|
| PATENT NO. | : 6,316,050 B1 | Page 1 of 1 |
| APPLICATION NO. | : 09/217886 | |
| DATED | : November 13, 2001 | |
| INVENTOR(S) | : Troll et al. | |

It is certified that error appears in the above-identified patent and that said Letters Patent is hereby corrected as shown below:

On the face of the patent, below the section under (76), the following paragraph should be inserted.

-- (73) Assignee: Degussa AG, Dusseldorf (DE) --

Signed and Sealed this

Twenty-fifth Day of March, 2008

JON W. DUDAS
*Director of the United States Patent and Trademark Office*